No. 739,250. PATENTED SEPT. 15, 1903.
G. E. WOODBURY.
BOLT.
APPLICATION FILED JAN. 17, 1903.
NO MODEL.

WITNESSES
Chas E. Wisner
W. A. Greenburg

INVENTOR
George Edward Woodbury
By Parker + Burton
Attorneys.

No. 739,250. Patented September 15, 1903.

UNITED STATES PATENT OFFICE.

GEORGE EDWARD WOODBURY, OF CHARLOTTE, MICHIGAN.

BOLT.

SPECIFICATION forming part of Letters Patent No. 739,250, dated September 15, 1903.

Application filed January 17, 1903. Serial No. 139,391. (No model.)

*To all whom it may concern:*

Be it known that I, GEORGE EDWARD WOODBURY, a citizen of the United States, residing at Charlotte, county of Eaton, State of Michigan, have invented a certain new and useful Improvement in Bolts; and I declare the following to be a full, clear, and exact description of the invention, such as will enable others skilled in the art to which it pertains to make and use the same, reference being had to the accompanying drawings, which form a part of this specification.

This invention relates to bolts, and has for its object an improved bolt attachment employed to prevent the bolt from escaping from the parts which it is used to hold together.

The attachment is especially useful in connection with bolts that are used to couple thills to vehicles, and it is shown in connection with such coupling in one of the drawings connected herewith.

Figure 2:
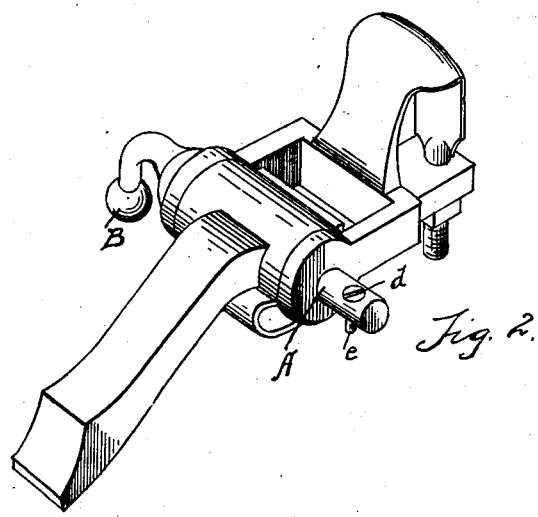
Figure 1:
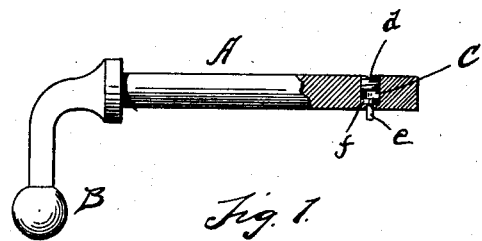

In the drawings, Figure 1 is a side elevation, partly in section. Fig. 2 is a perspective showing the bolt in use in connection with the thill-coupling.

A indicates the body of the bolt, and B indicates a weight attached to the head of the bolt and secured to one side of the axial line of the bolt, preferably by making the head of elongated form and bending it to one side. The weight B may be an enlargement on the bent head of the bolt, or it may be simply the head bent around without any enlargement. Through the body of the bolt is a hole, the bore of which on the side opposite the weight B is larger in diameter than that part of the bore which is on the side next to the weight B. The larger end of the hole is screw-threaded, and a short piece of screw *d* is inserted therein, either without a head or with a countersunk head, so that there is no protruding end to the screw. Underneath the screw in the hole is a cavity C, and a pin *e* is inserted through the small side of the hole, with the head *f* in the cavity C and with the small end of the pin engaging through the small part of the hole. The pin is so short that it may drop entirely into the cavity C with no protruding end, but will readily take a position with a short portion of the pin protruding when the bolt is turned to bring the small hole to the under side. A bolt inserted in a coupling in a way to be normally horizontal naturally turns to bring the weighted end B down, and in this position the end of the pin *e* projects from the bolt and effectually prevents the bolt from escaping from the parts it is employed to couple. When, however, the bolt is forcibly turned to bring the weighted end up, the pin drops back into the cavity and the bolt is easily withdrawn. Even if the bolt engages tightly through the parts that it is employed to couple it soon assumes the locking position in use under the action attending the use of the parts.

What I claim is—

1. The combination of a bolt with a weight arranged eccentric to its axis, a loose pin arranged to project through a hole in the side of the bolt in one position of the bolt and to drop back into a cavity in another position of said bolt, said weight being so located as to act to turn the bolt into the position at which said pin protrudes, substantially as described.

2. The combination of a bolt, a weight arranged eccentric to its axis, a loose pin arranged to be projected from the side of said bolt by gravity when said bolt is turned to bring the pin at the lower part thereof, said weight being so located with reference to the bolt that it shall turn the pin downward.

In testimony whereof I sign this specification in the presence of two witnesses.

GEORGE EDWARD WOODBURY.

Witnesses:
A. B. COLLINS,
SAMUEL POLLOCK.